(12) United States Patent
Santangelo et al.

(10) Patent No.: US 10,988,241 B2
(45) Date of Patent: Apr. 27, 2021

(54) REMOVABLE CAGE FOR DRONE

(71) Applicant: SKYPERSONIC, LLC, Rochester, MI (US)

(72) Inventors: Giuseppe Santangelo, Troy, MI (US); Yawar Afzali, Farmington Hills, MI (US); Matteo Pizzolante, Casarano (IT)

( * ) Notice: Subject to any disclaimer, the term of this patent is extended or adjusted under 35 U.S.C. 154(b) by 336 days.

(21) Appl. No.: 15/957,973

(22) Filed: Apr. 20, 2018

(65) Prior Publication Data
US 2019/0322362 A1    Oct. 24, 2019

(51) Int. Cl.
| B64C 27/00 | (2006.01) |
| B64C 25/58 | (2006.01) |
| B64C 39/02 | (2006.01) |
| B62J 27/00 | (2020.01) |

(52) U.S. Cl.
CPC ............ *B64C 27/006* (2013.01); *B64C 25/58* (2013.01); *B64C 39/024* (2013.01); *B62J 27/00* (2013.01); *B64C 2201/108* (2013.01); *B64C 2201/146* (2013.01)

(58) Field of Classification Search
CPC ............ B64C 2201/027; B64C 27/006; B64C 2201/12; A63H 27/12
See application file for complete search history.

(56) References Cited

U.S. PATENT DOCUMENTS

| 4,505,346 A | 3/1985 | Mueller |
| 6,976,899 B1 | 12/2005 | Tamanas |
| 7,073,748 B2 | 7/2006 | Maurer et al. |
| 7,273,195 B1 | 9/2007 | Golliher |
| 9,067,667 B2* | 6/2015 | Yan .................... B64C 27/10 |
| 9,150,069 B2* | 10/2015 | Kalantari ............ B64C 39/024 |
| 2009/0101760 A1 | 4/2009 | Ghogomu |
| 2011/0226892 A1 | 9/2011 | Crowther et al. |
| 2012/0181388 A1 | 7/2012 | Cowley |
| 2014/0014767 A1 | 1/2014 | Yan et al. |

(Continued)

FOREIGN PATENT DOCUMENTS

| FR | 2856378 A1 | 12/2004 |
| WO | WO-2013/105926 A1 | 7/2013 |
| WO | WO-2017/186967 A1 | 11/2017 |

OTHER PUBLICATIONS

Kalantari, A., "Design and Experimental Validation of HyTAQ, a Hybrid Terrestrial and Aerial Quadrotor," 2013 IEEE International Conference on Robotics and Automation (ICRA), Karlsruhe, Germany, May 6-10, 2013, pp. 4445-4450.

(Continued)

*Primary Examiner* — Richard G Davis
(74) *Attorney, Agent, or Firm* — arlson, Gaskey & Olds, P.C.

(57) ABSTRACT

A drone includes a surrounding cage which can be disassembled from a propeller-carrying internal base. In another aspect, a drone includes at least one fastening clip which attaches arcuate external ribs to a periphery of a central and internal frame, whereafter the fastening clip can be removed for disassembly of the ribs from the frame. Yet another aspect provides a flying drone employs a fastening clip including a snap fit and a generally U-shaped body. A further embodiment has a flying drone with at least one light externally mounted adjacent a periphery of a central propeller-carrying base, located between a pair of external ribs.

21 Claims, 6 Drawing Sheets

(56) References Cited

U.S. PATENT DOCUMENTS

| | | |
|---|---|---|
| 2014/0034776 A1 | 2/2014 | Hutson |
| 2014/0131507 A1 | 5/2014 | Kalantari et al. |
| 2014/0138477 A1 | 5/2014 | Keennon et al. |
| 2014/0319266 A1 | 10/2014 | Moschetta et al. |
| 2016/0137293 A1* | 5/2016 | Santangelo ............. B64C 37/00 244/50 |
| 2017/0291697 A1* | 10/2017 | Kornatowski .......... B64C 27/20 |
| 2018/0002035 A1* | 1/2018 | Neely .................. H04N 13/296 |

OTHER PUBLICATIONS

Quanser, "New Quanser Quadrotor UAV," http://quanser.blogspot.de/2009/08/new-quanser-uav.html, Wednesday, Aug. 26, 2009, 4 pages.

Amoozgar, M.H., "Fault-Tolerant Fuzzy Gain-Scheduled PID for a Quadrotor Helicopter Testbed in the Presence of Actuator Faults," IFAC COnference on Advances in PID COntrol PID '12, Brescia (Italy)), Mar. 28-30, 2012, 6 pages.

Quanser Inc., Qball-X4 User Manual, Document No. 829, Revision 12 (2011), accessible from http://users.encs.concordia.ca/~realtime/coen421/doc/Quanser%20QBall-X4%20-%20User%20Manual.pdf; accessed Feb. 9, 2017, 28 pages.

Concordia University, Real-time System Lab—COEN421 (2011); http://users.encs.concordia.ca/~realtime/coen421/index.html; accessed Feb. 9, 2017, 1 page.

Skycopter photographs—Offered for sale prior to 2018.

"Skycopter—UHV (Unmanned Hybrid Vehicle) for indoor spaces," Skypersonic, published before Apr. 2018, 3 pages.

"World's First LED Spherical Drone Display," News Shooter, posted Aug. 27, 2017, 5 pages.

Ratanasawanya, Chayatat, "Flexible Vision-Based Control of Rotorcraft—The Case Studies:2DOF Helicopter and 6DOF Quadrotor," Graduate Thesis, University of Regina, Dec. 2011, 146 pages.

* cited by examiner

REMOVABLE CAGE FOR DRONE

BACKGROUND AND SUMMARY

The present application generally pertains to flying drones and more particularly to a drone having a removable cage and/or with a peripheral light.

Flying drones having multiple propellers are generally known. One recent example encloses propellers of a drone within a spherical enclosure, as is disclosed in U.S. Patent Publication No. 2016/0137293 entitled "Enclosed Drone Apparatus and Method for Use Thereof," which is commonly invented and is incorporated by reference herein. While this prior enclosed drone is a significant improvement in the field, there is room for further improvement. For example, during assembly, the enclosure is adhesively bonded to a periphery of an internal central frame, to which propellers are mounted, to provide a permanently affixed assembly which cannot be disassembled.

In accordance with the present invention, a drone includes a surrounding cage which can be disassembled from a propeller-carrying internal base. In another aspect, a drone includes at least one fastening clip which attaches arcuate external ribs to a periphery of a central and internal frame, whereafter the fastening clip can be removed for disassembly of the ribs from the frame. Yet another aspect provides a flying drone employs a fastening clip including a snap fit and a generally U-shaped body. A further embodiment has a flying drone with at least one light externally mounted adjacent a periphery of a central propeller-carrying base, located between a pair of external ribs. A method of assembling and/or disassembling a drone employing a generally spherical enclosure, an internal base and a removable fastening clip, is also provided.

The present drone is advantageous over conventional devices. For example, the external ribs are removable from the base to allow more compact storage of the drone after use or during re-shipping. Furthermore, the present drone advantageously can be disassembled to allow the base to be remotely flown without the external cage, if such is desired. The removable fastening clips of the present drone beneficially allow for easy replacement of the external ribs in the event of damage during use. Moreover, the light position of the present drone advantageously provides improved illumination for a centrally mounted camera, without being obstructed by the external cage. Additionally, the peripheral area of the base is ideally suited for the light mounting since the central area of the base is otherwise encumbered with a battery, electronics, the camera and other optional sensors, and radially extending arms of the base advantageously provide a carrier for electrical conductors between the light and the battery. Additional advantages and features of the present drone will become apparent from the following description and claims, as well as from the appended drawings.

DETAILED DESCRIPTION

Referring to FIGS. 1-6, a drone 21 includes an internal and central frame or base 23 and a general spherical cage 25 externally surrounding the base. Base 23 includes a central platform 27, a generally circular peripheral ring 29 and multiple arms 31 radially extending between the central platform and the ring. Base 23 is essentially a flat fiberglass board with the top or bottom surfaces of platform 27, arms 31 and ring 29 all preferably being co-planar. Moreover, ring 29 has multiple laterally enlarged nodes 30 each containing an outwardly accessible and open slot 32.

Electromagnetic motor actuators 33 are mounted upon laterally enlarged portions of arms 31 and rotatable propellers 35 are coupled to and driven by the actuators. There are preferably four actuators and propellers, however, more or less may be employed although flight performance, cost and size may not be as advantageous. A rechargeable battery and electronics are mounted upon central platform 27 within a housing 37. An optional camera 39 and/or other sensors, such as for temperature, humidity, chemical identification, vibration or the like may also be mounted to or within housing 37, or to a bottom of platform 27.

Cage 25 includes at least four and more preferably twelve arcuate ribs 51, which define a generally spherical peripheral shape. Each rib 51 is latitudinally elongated with a central inwardly enlarged node 53 having a radial slot 55 therein. Furthermore, each rib 51 has inwardly angled distal ends 56, defining generally L-shapes, which are removably received within circumferentially spaced apart apertures 57 in an annular pole structure 59. A polymeric cap 61 is press fit into a center opening of pole structure 59 to clamp distal ends 56 of ribs 51 therein. Cap 61 is removable from pole structure 59 to allow removal of rib ends 56 therefrom. Alternately, cap 61 may have an external thread for rotational engagement with an internal thread or projections of pole structure 59 to facilitate assembly and disassembly. Ribs 51 are preferably made from a flexible yet durable polymeric material, such as a glass or carbon fiber filled Nylon.

A fastening clamp or clip 71 includes a generally U-shaped body 73 with multiple elongated fingers 75 and 77 projecting adjacent ends thereof. Each finger 75 is flexible with a barbed snap fit 79 at an end. Furthermore, each finger 77 provides a uniform straight surface opposed to snap fit 79, although finger 77 may alternately have a non-uniform surface or formation thereon. Body 73 is centrally enlarged and contains an inwardly and openly accessible slot 81 elongated somewhat (for example, within fifteen degrees) in the same direction as a direction of elongation of fingers 75 and 77. Fastening clip 71 is preferably made from a polymeric material such as a Nylon reinforced with carbon or carbon fiber Onyx material.

During assembly, after all of the electronic and flight components have been attached to base 23, slots 55 of ribs 51 are aligned with and then pressed into engagement with slots 32 of ring 51. No adhesive is used. Slots 81 of fastening clips 71 are then aligned with an outer surface of ribs 51 and they are pressed together, without any adhesive, whereby snap fits 79 ride over and then engage an inner surface of ring 29. Thus, snap fit 79 and the opposite finger 77 serve to firmly clamp the upper and lower surfaces of ring therebetween. Distal ends 56 of ribs 51 are thereafter attached to pole structures 59 and caps 61 are subsequently affixed. This places the ribs in a spaced apart relationship surrounding and crossing the longitudinally oriented plane of the base. And each fastening clip externally spans across the associated rib with a pair of the clip fingers being clamped onto sections of the base ring on either side of the rib.

Unlike with traditional drones, the present drone construction allows for easy manual and nondestructive disassembly of the cage from the base. Snap fits 79 are upwardly pried above the adjacent upper surface of ring 29 while bodies 73 of fastening clips 71 are pushed or pulled to disengage from ribs 51. Thus, removal of the clips from the ribs allows for subsequent removal of one or more of the ribs from the base. The distal ends of the ribs can be optionally removed from the pole structures if it is desired to stack the ribs for storage or shipping; or the ends of the ribs may remain attached to the pole structures if it is instead desired to flex apart a pair of the ribs, still assembled into the spherical cage, and remove the base therefrom to ease subsequent reassembly.

The spherical shape of the cage allows the drone to be rolled along a floor (manually and/or via propeller energization) when initially inserted into a building 91 or other structure having an internal space at least partially enclosed by a floor, side and ceiling walls 93. Cage also allows the drone to roll when contacting against the walls during flight without damage to the drone or walls. Drone is preferably remote controlled from a spaced apart stationary radio frequency or other control station; this may be hand held, automotive vehicle mounted or from a computer terminal.

Figures 1, 2:
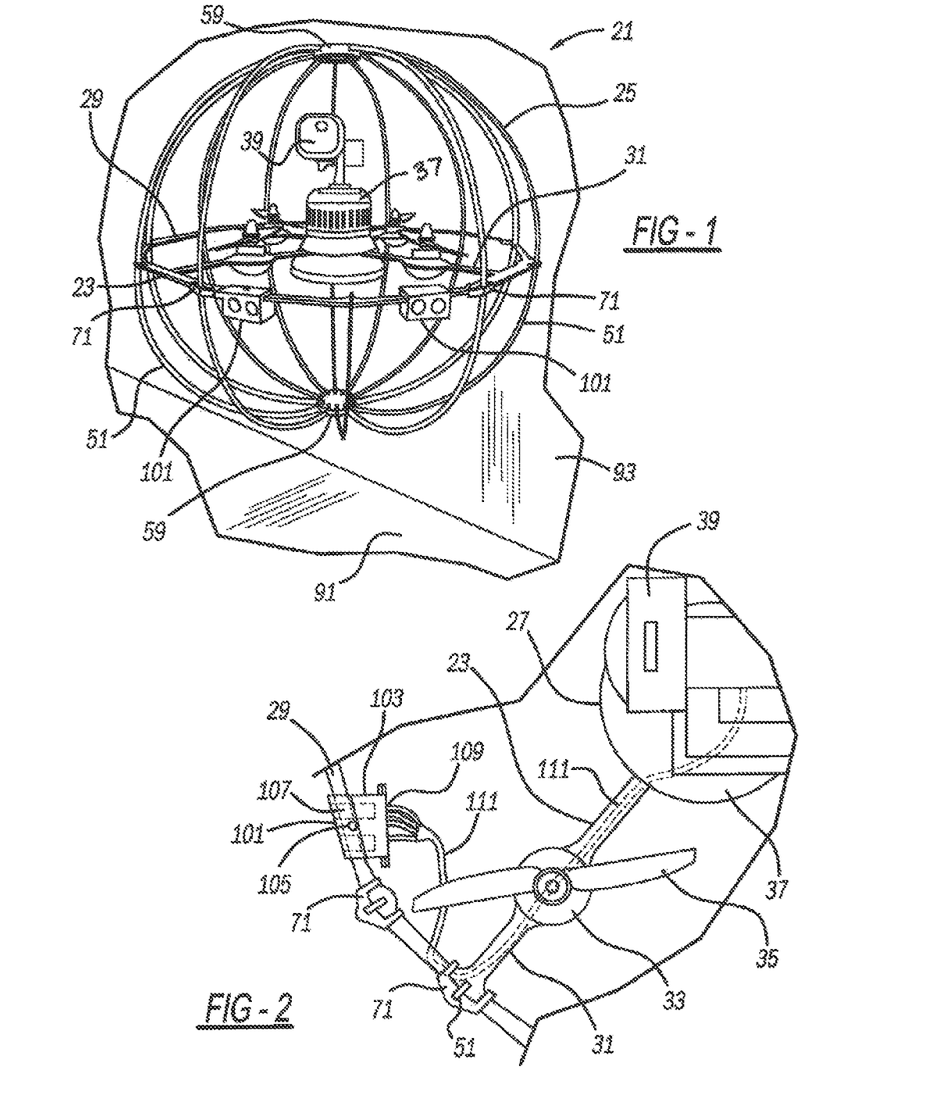
FIG. 1 is a perspective view showing the present drone.
FIG. 2 is a fragmentary top view showing the drone.
Figure 3:
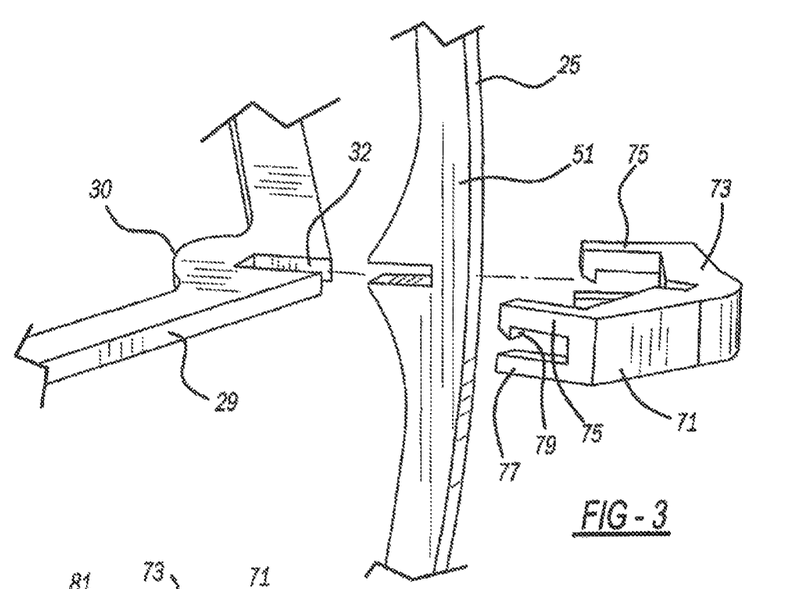
FIG. 3 is a fragmentary and exploded perspective view showing the drone.
Figure 4:
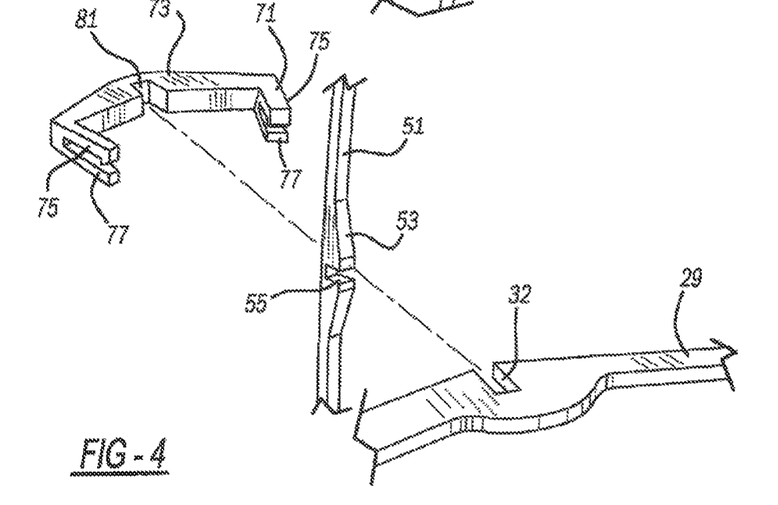
FIG. 4 is a fragmentary and exploded perspective view, taken opposite that of FIG. 3, showing the drone.
Figure 5:
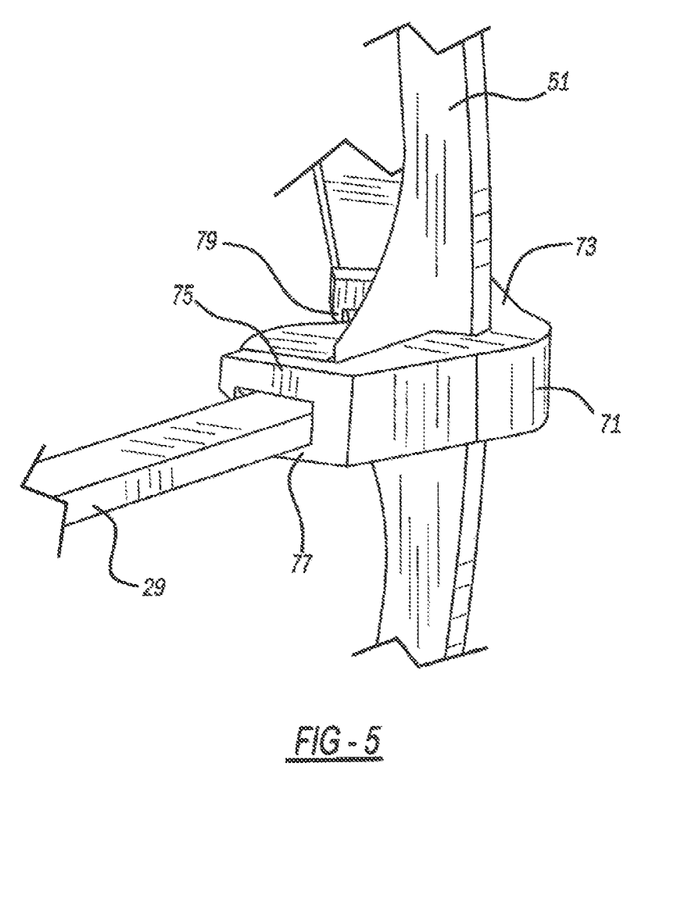
FIG. 5 is a fragmentary perspective view showing the drone.
Figure 6:
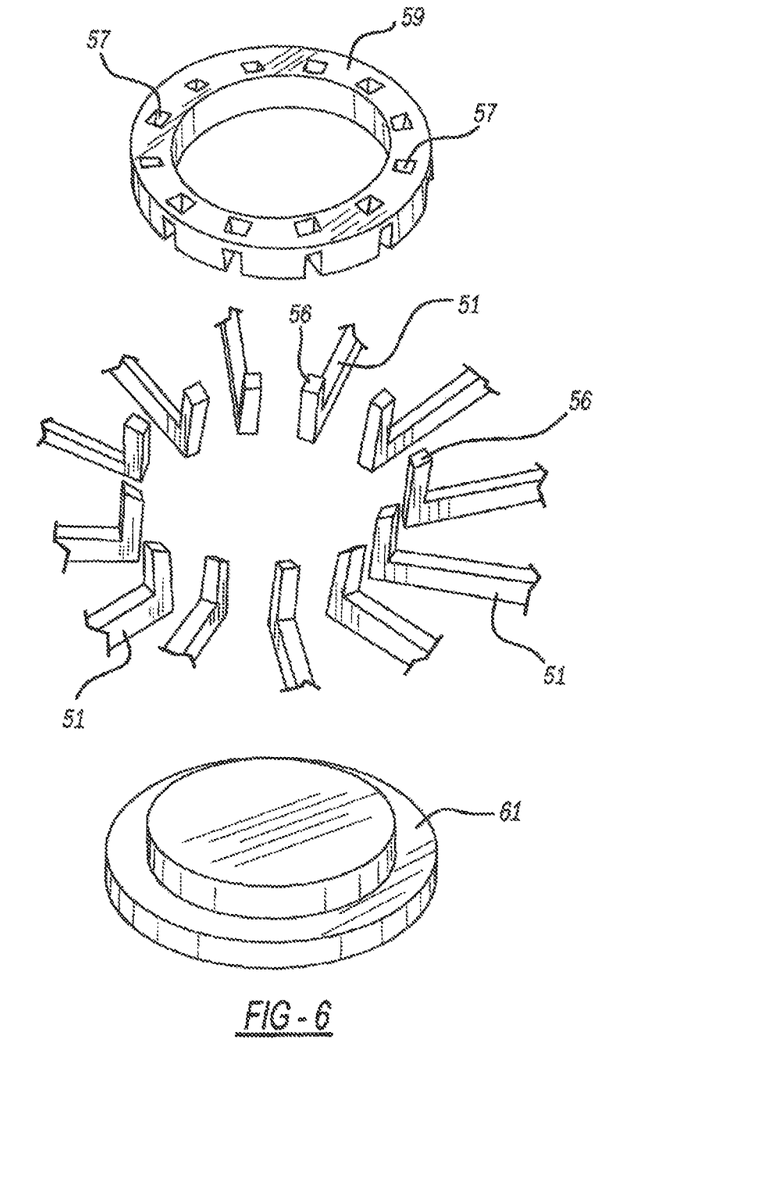
FIG. 6 is a fragmentary and perspective view showing the drone.

FIGS. 1 and 2 illustrate an optional light system 101 employed with drone 21. A light housing 103 is affixed to ring 29 via a threaded fastener 105, rivet, snap fit, or the like. There are preferably two such light housings 103 attached to ring 29, which each housing being located between a pair of ribs 51; a half length rib is shown between the housings in the presently illustrated example. At least one and more preferably two, light emitting diodes ("LEDs") 107 are mounted within each housing and face outwardly therefrom. Electrical connectors 109 are removably attached to an inner end of LEDs 107 and electrical conductive wires 111 run between each light system 101 and the central battery, attached to an underside of the associated arms 31. The positioning of the light systems to the peripheral ring of the base, and between the ribs, advantageously provides unobstructed illumination for the camera when the drone is flown into the enclosed building or structure.

Figure 7:
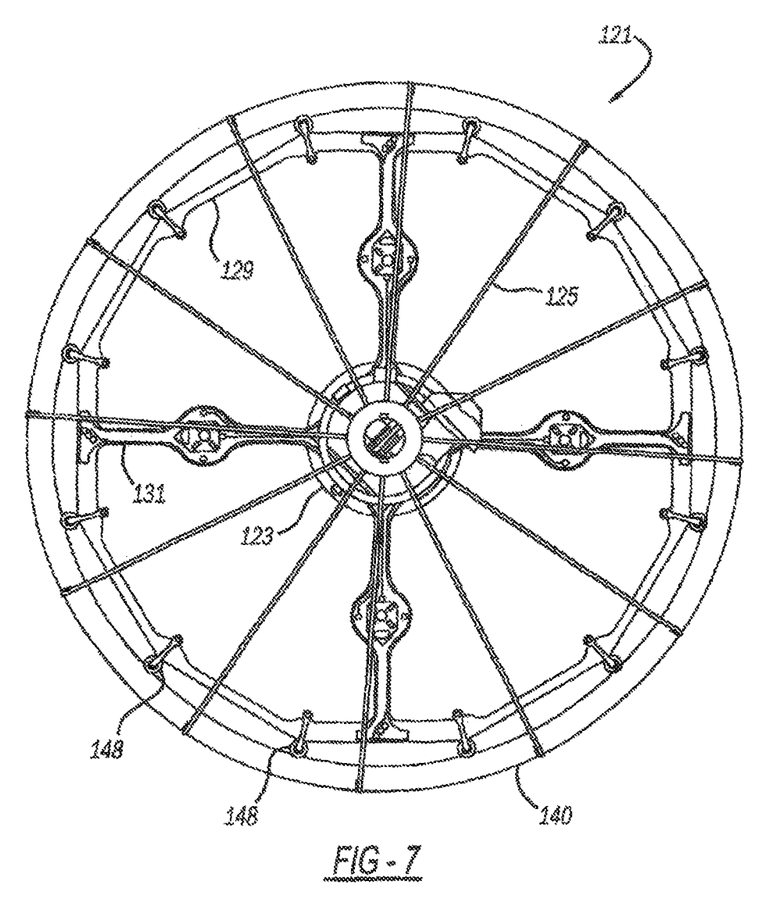
FIG. 7 is a top elevational view showing another embodiment of the present drone.
Figure 8:
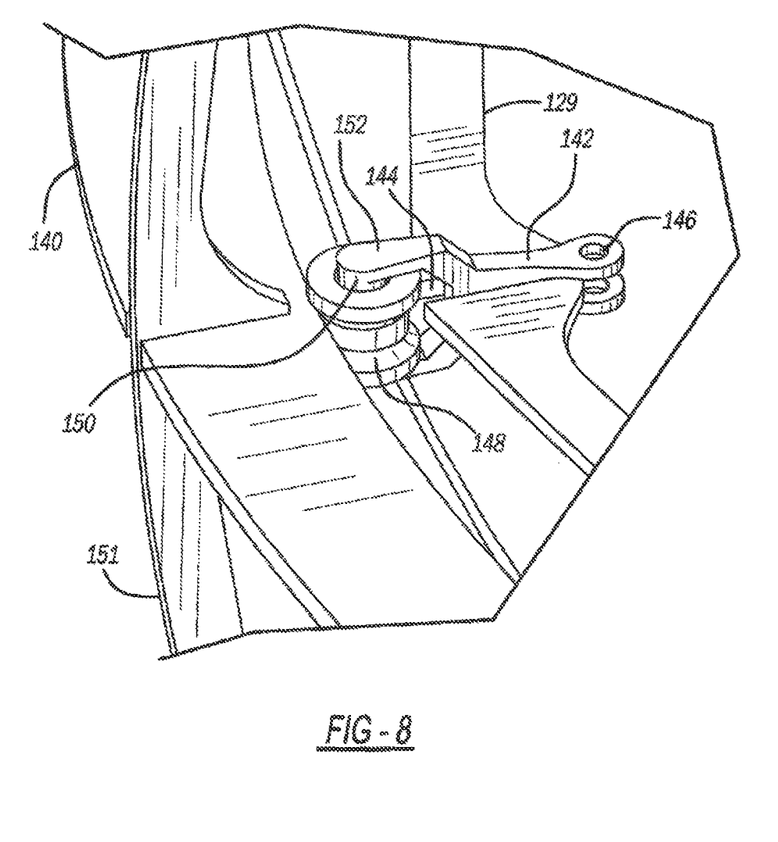
FIG. 8 is an enlarged and fragmentary perspective view showing the drone of FIG. 7.

Another embodiment of a flying drone 121 is illustrated in FIGS. 7 and 8. This exemplary drone 121 includes a base 123, propellers (not shown), actuators (not shown), electronics, and cage 125 with spaced apart ribs 151, like with the previously disclosed embodiment. However, the present embodiment employs an outer ring 140 that generally surrounds an inner ring 129 in a generally concentric manner (although one or both of the rings may not be exactly circular). Outer ring 140 may be permanently adhered to ribs 151 with mating slots, or ribs 151 may be removably attached to outer ring 140 by way of mating slots and fastening clips like those of the previous embodiment (optionally with the snap fits received within depressions to present a flush interior edge). Inner ring 129 is integrally created as part of arms 131 as a single piece.

A clevis member 142 includes a pair of generally parallel arms which sandwich a laterally enlarged node of inner ring 129. Aligned holes 146 are in an inner end of clevis 142 for receiving a cotter or other fastening pin therein, or snap fits may replace the holes. A central wall integrally extends between the arms of clevis 142 and is received within an outwardly open slot 144 of inner ring 129. Clevis 142 may alternately be secured to inner ring 129 in a different manner such as through rivets, screws, sonic welding, adhesive or the like.

A wheel 148 rotates about an elongated axial pin 150. Ends of pin 150 are secured to outwardly elongated legs 152 of clevis 142. Wheel 148 preferably has a generally hourglass side view shape including enlarged circular upper and lower segments, tapered segments next to the upper and lower segments, and a circular middle segment between the tapered segments. The middle segment has a smaller diameter than the upper and lower segments.

Multiple of the wheel assemblies are coupled to inner ring 129 in a spaced apart relationship, and more preferably at least six, and most preferably twelve of the wheel assemblies are used. The middle segment of each wheel 148 rides against an internal edge of outer ring 140 and the tapered segments of each wheel 148 maintain the relative ring-to-ring positioning. The present wheel configuration advantageously allows cage 125 to rotate independently from base 123. Thus, the base with its propellers and camera can maintain an upright and/or other desired orientation or yaw position despite and insensitive to forward movement and obstacle bumping of the cage against side walls of a surrounding building or other structure.

It is alternately envisioned that the wheel assemblies and outer ring may extend through the poles or have other offset positioning rather than at the equator as shown. Furthermore, the wheel assemblies can be reversed such that the clevises are secured to the outer ring or ribs with the wheels riding against an exterior edge of the inner ring.

While various features have been disclosed, it should be appreciated that other variations may be made to the present drone. For example, the electrical conductors running along the arms may be printed circuits or metal stampings. As another example, the camera can be located in or between the light housings. Another variation uses stamped sheet metal fastening clips to removably fasten the ribs to the base, although some of the preferred benefits may not be achieved. A further example provides a fastening clip employing an elastomeric band or cotter-pin like shape which flexes to engage and disengage the rib and/or ring, but some of the present advantages may not be realized. A different variation has one or more snap fits on outwardly extending fingers, with the snap fits engaging the rib and a body of the clip being otherwise secured to the ring of the base. The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A drone comprising:
   (a) a base including arms outwardly radiating between a central platform and a peripheral ring;
   (b) rotatable propellers and electromagnetic actuators coupled to the base, the actuators being remotely controllable;

(c) a substantially spherical cage externally surrounding the base, propellers and actuators, the cage comprising multiple arcuate ribs; and (d) clips fastening the ribs to the peripheral ring of the base, each of the clips including a flexible finger capable of snapping over a portion of at least one of the ring and the rib to removably secure the rib to the ring, and the clips being removable to allow disassembly of the cage from the base.

2. The drone of claim 1, wherein each of the clips further comprises:

a body spanning across the associated ribs;

multiples of the flexible finger, with at least one of the flexible fingers being on each lateral side of the associated rib when the clip attaches the rib to the ring of the base.

3. The drone of claim 2, wherein each of the clips has a substantially LI-shape and the body includes a central slot which operably receives an external edge of the associated rib therein.

4. The drone of claim 1, wherein the clips are polymeric.

5. The drone of claim 4, wherein the finger is a snap fit which engages an internal edge of the ring of the base when assembled, and the snap fit is capable of being pried to an open position to allow removal of the associated clip from the associated rib and ring of the base.

6. The drone of claim 1, further comprising a light mounted to the ring of the base between a pair of the ribs.

7. The drone of claim 6, further comprising a camera coupled to the central platform of the base and an electrical conductor running from the light along one of the arms and to the central platform, the light operably providing outward illumination for the camera free of blockage by the ribs.

8. The drone of claim 1, further comprising a pole receiving distal ends of all of the ribs and an end cap removably coupled to the pole to secure the ribs therebetween, the cap being removable from the pole to allow disassembly of the ribs from each other.

9. The drone of claim 1, wherein all of the ribs are disassembleable from each other and are disassembleable from the base to provide a smaller storage dimension as compared to when the cage is assembled to the base.

10. The drone of claim 1, wherein a node of the ring is enlarged and fits within a slot of the associated rib, or vice versa, and the clip contacts both of the ring and the associated rib adjacent the node.

11. The drone of claim 1, wherein the cage is capable of rolling against at least one internal wall surface within an enclosed structure, without harm to the drone when flying.

12. A drone comprising:

(a) a base including a peripheral frame;

(b) rotatable propellers coupled to the base;

(c) a cage externally surrounding the base, the cage comprising multiple elongated and spaced apart ribs, the ribs being elongated in directions substantially perpendicular to a plane along which the base is laterally enlarged; and (d) at least one fastener being removeably secured to at least one of the base and at least one of the ribs, the fastener having a substantially LI-shape and including a snap fit, and the fastener securing the at least one of the ribs to the peripheral frame of the base when the propellers are rotated.

13. The drone of claim 12, wherein the fastener includes a central body and multiple elongated flexible fingers extending from the body, and the snap fit projects from one of the fingers to engage with an internal edge of the frame.

14. The drone of claim 12, wherein the fastener is polymeric and the body externally covers an adjacent position of the associated rib.

15. The drone of claim 12, wherein the fastener includes a central slot that receives an edge of the associated rib opposite the frame.

16. The drone of claim 12, wherein a peripheral edge of the frame detachably mates within a slot of an interior of each of the ribs, with the fastener spanning across an exterior of the associated rib, and the snap fit is removeably secured to the frame.

17. The drone of claim 12, wherein removal of the fastener allows the ribs to be disassembled from the base.

18. The drone of claim 12, further comprising a pole receiving distal ends of all of the ribs and an end cap removeably coupled to the pole to secure the ribs therebetween, the cap being removable from the pole to allow disassembly of the ribs from each other.

19. The drone of claim 12, wherein all of the ribs are disassembleable from each other and are disassembleable from the base to provide a smaller storage dimension as compared to when the cage is assembled to the base.

20. The drone of claim 12, further comprising a light mounted to the frame of the base between a pair of the ribs.

21. The drone of claim 12, wherein the cage is capable of rolling against at least one internal wall surface within an enclosed structure, without harm to the drone when flying.

* * * * *